United States Patent
Hagemann et al.

(10) Patent No.: US 12,179,979 B2
(45) Date of Patent: Dec. 31, 2024

(54) FILM COMPOSITE, FILM PACKAGING, AND METHOD FOR THE PRODUCTION OF A FILM COMPOSITE

(71) Applicant: Mondi AG, Vienna (AT)

(72) Inventors: Andreas Hagemann, Gronau (DE); Helga Elling, Steinfurt (DE); Andreas Neumann, Halle (DE)

(73) Assignee: Mondi AG, Vienna (AT)

( * ) Notice: Subject to any disclaimer, the term of this patent is extended or adjusted under 35 U.S.C. 154(b) by 0 days.

(21) Appl. No.: 17/825,065

(22) Filed: May 26, 2022

(65) Prior Publication Data

US 2022/0388745 A1    Dec. 8, 2022

(30) Foreign Application Priority Data

Jun. 1, 2021    (DE) .................... 10 2021 114 174.5

(51) Int. Cl.
| | | |
|---|---|---|
| *B65D 65/42* | (2006.01) | |
| *B05D 3/12* | (2006.01) | |
| *B05D 7/00* | (2006.01) | |
| *B32B 7/12* | (2006.01) | |
| *B32B 27/08* | (2006.01) | |
| *B32B 27/32* | (2006.01) | |

(Continued)

(52) U.S. Cl.
CPC .............. *B65D 65/42* (2013.01); *B05D 3/12* (2013.01); *B05D 7/54* (2013.01); *B32B 7/12* (2013.01); *B32B 27/08* (2013.01); *B32B 27/32* (2013.01); *B32B 27/40* (2013.01); *B65D 65/40* (2013.01); *B32B 2255/10* (2013.01); *B32B 2255/26* (2013.01); *B32B 2553/00* (2013.01)

(58) Field of Classification Search
CPC .......... C08J 5/18; C08J 2327/18; B32B 3/28; B32B 27/08; B32B 27/322; B32B 37/182; B32B 38/0012; B32B 2307/518; B32B 2307/7246; C08L 27/18
See application file for complete search history.

(56) References Cited

U.S. PATENT DOCUMENTS

| | | | |
|---|---|---|---|
| 2013/0255880 A1* | 10/2013 | Mahdi ................... | C09J 175/04 |
| | | | 156/331.7 |
| 2017/0121578 A1* | 5/2017 | Garmann ................. | B32B 7/12 |
| 2018/0304607 A1* | 10/2018 | Öhman ................... | B32B 15/12 |

(Continued)

FOREIGN PATENT DOCUMENTS

| | | |
|---|---|---|
| DE | 20 2004 019 009 U1 | 3/2005 |
| DE | 10 2019 107 619 A1 | 10/2020 |

(Continued)

OTHER PUBLICATIONS

EP-2987744-A1 Machine Translation (Year: 2016).*

(Continued)

*Primary Examiner* — Travis M Figg
(74) *Attorney, Agent, or Firm* — Collard & Roe, P.C.

(57) ABSTRACT

A film composite for film packaging, having a cover film composed of a polyolefin and a barrier layer, wherein the cover film has an imprinting, at least in part, on a side that faces the barrier layer. An equalization layer is arranged between the cover film and the barrier layer, which layer borders, at least in part, on the imprinting, wherein the equalization layer is formed from a hardened material on the basis of polyurethane.

18 Claims, 2 Drawing Sheets

(51) Int. Cl.
    *B32B 27/40*          (2006.01)
    *B65D 65/40*         (2006.01)

(56)               References Cited

U.S. PATENT DOCUMENTS

| | | | |
|---|---|---|---|
| 2019/0315540 A1* | 10/2019 | Veit | B65D 75/5844 |
| 2020/0270042 A1* | 8/2020 | Kehoe | A01N 47/44 |
| 2020/0307171 A1* | 10/2020 | Koesters | B32B 5/02 |
| 2021/0047096 A1* | 2/2021 | Obermann | B32B 7/12 |

FOREIGN PATENT DOCUMENTS

| | | | | |
|---|---|---|---|---|
| EP | 0710683 A1 * | 5/1996 | | |
| EP | 0 951 390 B1 | 3/2004 | | |
| EP | 2987744 A1 * | 2/2016 | | B29C 53/066 |
| EP | 2 583 834 B1 | 3/2016 | | |
| EP | 2987744 B1 * | 7/2017 | | B29C 53/066 |
| GB | 2 580 318 A | 7/2020 | | |
| WO | WO-9834982 A1 * | 8/1998 | | C08K 5/07 |
| WO | 00/16975 A1 | 3/2000 | | |

OTHER PUBLICATIONS

EP-0710683-A1 Machine Translation (Year: 1996).*
German Search Report dated Jan. 4, 2022 in German Application No. 10 2021 114 174.5 with English translation of the relevant parts.

* cited by examiner

FILM COMPOSITE, FILM PACKAGING, AND METHOD FOR THE PRODUCTION OF A FILM COMPOSITE

CROSS REFERENCE TO RELATED APPLICATIONS

Applicant claims priority under 35 U.S.C. § 119 of German Application No. 10 2021 114 174.5 filed Jun. 1, 2021, the disclosure of which is incorporated by reference.

BACKGROUND OF THE INVENTION

1. Field of the Invention

The present invention relates to a film composite for film packaging, in particular for flexible film packaging, having a cover film composed of a polyolefin and a barrier layer, wherein the cover film has an imprinting, at least in part, on a side that faces the barrier layer.

2. Description of the Related Art

In the sector of the foods industry, above all, there is constantly an effort to protect packaged goods from outside influences to the greatest possible extent, so as to be able to maintain the properties of the packaged goods over a long period of time. For this purpose, barrier layers are generally incorporated into the packaging material, which are supposed to reduce the penetration of oxygen or humidity, thereby making it possible to significantly increase the shelf life of the packaged goods. At the same time, it is also possible to achieve what is called a fat barrier using such barrier layers, which prevents the fat contained in the packaged goods from migrating through the packaging and thereby causing the corresponding packaged goods to dry out. Furthermore, the migration of fat can also lead to impairment of the optical quality of the packaging.

For this reason, different approaches are known from the state of the art for implementing such a barrier layer, for which purpose films are coated with a layer of aluminum oxide and/or silicon oxide, for example. Such a coating does effectively prevent the migration of fat, but such an embodiment is comparatively expensive and is only suitable for specific types of packaged goods, because only a slight degree of flex-crack resistance is present due to the extremely great stiffness of the coating materials. Because of this low flex-crack resistance, it is therefore possible that the fat barrier prematurely weakens or completely collapses at specific locations of the packaging.

Furthermore, such film composites are usually supplied in a prefabricated or already coated form, so that imprinting must take place on the finished film composite. Depending on the ink system, problems with ink adhesion can occur in this regard. Furthermore, the coating also cannot protect the imprinting itself. If therefore fat can migrate outward from the packaging, the ink layers of the imprinting will also be contaminated with fat. This leads to optically disadvantageous effects or actually to delamination of the individual composite layers.

Alternatively, it is also known to use ethylene vinyl alcohol copolymer (EVOH) as a barrier layer, wherein, however, EVOH is not compatible with common polyolefins. Against this background, additional adhesion-imparting layers are required, which make co-extrusion with the layer composed of ethylene vinyl alcohol copolymer possible. However, EVOH co-extrusion structures always require a specific minimum dimension of layer thickness, below which it is not possible to go.

From the state of the art, it is furthermore known to use polyvinyl alcohol (PVOH) as a barrier layer, wherein the barrier layer formed from this demonstrates a significantly greater bending strength as compared with aluminum oxide or silicon oxide layers. Furthermore, such a coating can also be applied to an imprinted cover film subsequently, in an advantageous manner, so that effective protection of the imprinting is also possible.

A corresponding embodiment is known, for example, from EP 0 951 390 B1, in which, at first, a film composed of a biaxially oriented polyethylene terephthalate (PET) is first imprinted and subsequently coated with polyvinyl alcohol. In addition, a metallic layer is furthermore provided, by means of which the barrier property is supposed to be additionally enhanced. However, such an embodiment is correspondingly expensive and complicated in terms of its production, so that usually the metalized layer is left out.

EP 2 583 834 B1 teaches an embodiment in which a modified solution on the basis of polyvinyl alcohol is exclusively applied to a substrate composed of a biaxially oriented polypropylene, which solution then forms the actual barrier layer. In this connection, an adhesion-promoting agent on the basis of polyurethane can then serve for better adhesion conditions, onto which agent the actual barrier layer is then applied. The film composite formed in this manner can then be imprinted and processed further.

The solutions known from the state of the art have fundamentally proven themselves. However, nowadays great efforts are made to produce packaging, i.e. packaging materials, in a manner sorted by type to the greatest extent possible, so as to guarantee a high level of recyclability. Thus, for example, film composites that are formed from only one material, for example from a polyolefin, and have only a small proportion of other polymers, can be recycled almost completely, without prior separation. Consequently, therefore, the barrier layers should be structured to be as thin as possible, since these, in particular, are produced from a different polymer as compared with the cover film composed of polyolefin.

However, specifically the rear-side imprinting of the cover film leads to the result that the barrier layer composed of polyvinyl alcohol has to be applied to a surface that, in particular, forms an uneven surface area due to the imprinting, wherein the low thickness of the layer composed of polyvinyl alcohol is not sufficient to completely enclose the imprinting and the cover film. Only in this way, however, can a complete and continuous barrier effect be achieved.

SUMMARY OF THE INVENTION

Against this background, the present invention is based on the task of indicating a film arrangement that on the one hand can be produced in a cost-advantageous manner, producing a high-quality optical appearance, and, at the same time, is configured with only a small proportion of other polymers.

This task is accomplished by means of a film composite in accordance with a film composite for film packaging, having a cover film composed of a polyolefin and a barrier layer, wherein the cover film has an imprinting, at least in part, on a side that faces the barrier layer. An equalization layer is provided between the cover film and the barrier layer, bordering at least in part on the imprinting, wherein the equalization layer is formed from a hardened material on the basis of polyurethane (PU). Fundamentally, an aliphatic or an aromatic polyurethane can be used. An aliphatic polyurethane is a polyurethane which, in contrast to aromatic polyurethanes, does not contain any carbon atoms arranged in non-aromatic ring structures.

Within the scope of the invention, on the basis of polyurethane means that the equalization layer contains polyurethane at least up to a proportion of 50 wt.-%, preferably at least 80 wt.-%, and particularly preferably at least 90 wt.-%.

According to a preferred embodiment of the invention, the barrier layer is formed on the basis of polyvinyl alcohol (PVOH). Here, too, the barrier layer is then preferably formed from polyvinyl alcohol, and accordingly consists of at least 50 wt.-%, preferably at least 80 wt.-%, particularly preferably at least 90 wt.-% polyvinyl alcohol.

Alternatively, it can also be provided that the barrier layer is formed on the basis of an aqueous, acrylate-based material. Proceeding from such an embodiment, the barrier layer accordingly consists of at least 50 wt.-%, preferably at least 80 wt.-%, particularly preferably at least 90 wt.-% of this material.

In this connection, the corresponding information relates to a hardened state both for the barrier layer and for the equalization layer, since the barrier layer is usually applied in the form of a solution consisting of solvent and solids.

Accordingly, an equalization layer is arranged between the cover film and the barrier layer, bordering at least in part on the imprinting, wherein the equalization layer is formed from a hardened material on the basis of polyurethane. In this regard, the equalization layer makes it possible to even out the uneven areas caused, in particular, by the imprinting, in such a manner that in spite of the application of a comparatively thin barrier layer composed of polyvinyl alcohol, on the one hand a complete and continuous barrier layer is made possible, without the proportion of other polymers increasing significantly. At the same time, the imprinting, i.e. the printing ink, is protected against possible fat from the packaging contents by means of the barrier layer, so that it is ensured that the optical appearance can be maintained over an extended period of time.

In this case, both the barrier layer and the equalization layer can be kept comparatively thin, wherein the barrier layer and/or the equalization layer has/have a weight per surface area between 0.5 $g/m^2$ and 2.5 $g/m^2$, preferably between 0.7 $g/m^2$ and 1.5 $g/m^2$.

According to a preferred embodiment of the invention, the barrier layer immediately follows the equalization layer, so that accordingly, no further layers or films are arranged between the barrier layer and the equalization layer. Alternatively, it is provided that an adhesion-imparting layer is arranged between the equalization layer and the barrier layer. In this way, the adhesion effect between the two layers can be additionally improved. In this connection, acrylate varnishes or nitro-cellulose varnishes are particularly suitable, which are applied to the barrier layer and are then present in a hardened state.

The hardened material is preferably a polyurethane varnish, wherein a varnish preferably means, within the scope of the invention, a liquid coating substance, which is applied thinly and built up, by means of chemical or physical processes, to form a continuous, solid film. Particularly preferably, this is a two-component polyurethane varnish, which consists of two components that belong together, are made available separately from one another, and are only mixed together immediately before being used. These are, on the one hand, what is called the base varnish, and, on the other hand, what is called a hardener, wherein a chemical reaction takes place between the components, which leads to hardening of the layers. Against this background, such varnishes are also referred to as reaction varnishes.

Because of the small amounts of polyvinyl alcohol and polyurethane, it is possible to create an almost single-origin film composite, in which the proportion of polyolefin, with reference to the total film composite, amounts to more than 90 wt.-%, preferably more than 92 wt.-%, particularly preferably more than 95 wt.-%. Accordingly, the amount of non-polyolefin substances preferably amounts to less than 10 wt.-%, preferably less than 8 wt.-%, particularly preferably less than 5 wt.-%. Aside from the equalization layer and the barrier layer, the imprinting also represents a non-polyolefin material in this regard, wherein the weight per surface area of the imprinting preferably amounts to between 1 $g/m^2$ and 3 $g/m^2$. The imprinting furthermore does not need to be arranged over the full area of the cover film. Accordingly, the proportion of the printing ink for the imprinting can also be kept comparatively low.

Furthermore, an embodiment is preferred, in which the film composite—with the exclusion of the imprinting—is formed entirely of plastic. Accordingly, therefore, no layers of aluminum oxide or silicon oxide as well as no metallizations are provided.

The barrier property of the film composite can furthermore also be improved in that solid particles are arranged in the equalization layer. In this way, advantage is taken of the fact that fat cannot migrate through the solid particles themselves, or can migrate only with difficulty, wherein in addition, the solid particles displace the polyurethane in the equalization layer in such a manner that small channels form between the individual particles, through which the fat can clearly migrate only with greater difficulty than through an equalization layer that consists exclusively of polyurethane.

Fundamentally, an additional barrier effect can already be achieved solely by means of adding solid particles, wherein the proportion of the solid particles in the equalization layer does, however, preferably lie between 5 and 50 vol.-%.

Preferably the solid particles furthermore have an average diameter between 150 nm and 800 nm, preferably between 250 nm and 650 nm. In the case of such a diameter, it is possible, on the one hand, to at least partially equalize the uneven areas caused by the imprinting, and, on the other hand, to achieve an effective barrier effect.

According to a preferred embodiment of the invention, the solid particles are titanium dioxide particles ($TiO_2$), at least in part. In this regard, it should be noted that powders consisting of a plurality of particles usually have a certain proportion of contaminants, wherein, however, the proportion of titanium dioxide in the solid particles preferably amounts to more than 90 wt.-%, particularly preferably more than 95 wt.-%. The use of titanium dioxide particles in film composites is fundamentally known, wherein because of the white coloring of the particles a high-quality appearance can be implemented, on the one hand, and, at the same time, the rear-side imprinting of the cover film can be better distinguished as compared with the non-imprinted regions. Because of the fact that the equalization layer directly follows the imprinting, the optical appearance is consequently also influenced in a positive sense by means of the use of titanium dioxide particles, along with the equalization effect and the barrier effect.

Independent of the use of solid particles, it is provided, in accordance with one embodiment of the invention that the imprinting does not extend over the full area of the cover film, wherein the equalization layer encloses the imprinting in such a manner that the equalization layer forms an essentially planar surface on the side that borders on the barrier layer. In this way, not only are the uneven areas of the imprinting supposed to be compensated, but rather equalized completely, so that consequently, no elevations implicated by the imprinting have any effects for the configuration of the barrier layer.

According to a further development of the invention, the barrier layer is formed from a mixture of a polyvinyl alcohol that has a high molecular weight and one that has a low molecular weight. In this regard, the invention proceeds from the recognition that polyvinyl alcohols having a high molecular weight fundamentally have a better barrier effect than polyvinyl alcohols having a low molecular weight. However, they are also clearly more difficult to process, since they gel out very strongly and quickly. The processability is clearly improved by means of the addition of polyvinyl alcohol that has a low molecular weight. Such an embodiment is therefore preferred within the scope of the invention.

Preferably the proportion of polyvinyl alcohol that has a high molecular weight, with reference to the total proportion of polyvinyl alcohol in the barrier layer, amounts to between 20 and 50 wt.-%, particularly preferably between 25 and 45 wt.-%, and the proportion of polyvinyl alcohol that has a low molecular weight amounts to between 50 and 80 wt.-%, particularly preferably between 55 and 75 wt.-%.

According to a preferred embodiment of the invention, the barrier layer furthermore has a proportion of polyethyleneimine (PEI), by means of which the adhesion effect of the barrier layer can be significantly improved. In particular, it is possible to do without an additional adhesion-imparting layer in the case of such an embodiment.

Preferably the proportion of polyethyleneimines in the barrier layer amounts to between 0.5 and 1.5 wt.-%. Fundamentally, the adhesion effect can be improved by means of increasing the proportion.

The cover film preferably has a thickness between 20 $\mu$m and 50 $\mu$m, particularly preferably between 25 $\mu$m and 40 $\mu$m, and represents the essential material component as compared with the layers applied to it as well as the imprinting. Although the invention is fundamentally not restricted to the type of polyolefin used for the cover film, the cover film is preferably formed from a polyethylene, wherein within the scope of the invention, polyethylene also comprises all of the types derived from it. These types comprise, for example, polyethylene that has a very low density (LLDPE), low density (LDPE), medium density (MDPE), high density (HDPE), and very high density (HHDPE). For the cover film, a high-density polyolefin is used, in particular, which has at least one mono-axial orientation. In the case of a corresponding polyethylene, the cover film therefore has a weight per surface area of 28.5 g/m$^2$, for example, at a film thickness of 30 $\mu$m, which therefore lies clearly above the weight per surface area of the layers applied to it.

According to a further development of the invention, the cover film is furthermore corona-treated. The corona treatment is an electrochemical method for surface modification of plastics, so as to improve the imprintability of the surface, in particular. Polyolefins, in particular, can only be wetted poorly by printing inks, and therefore imprinting of such plastics or also their further processing by means of lamination or coating is not possible or only possible with difficulty. By means of the Corona treatment, it is possible to improve the wettability and the chemical affinity, so that the cover film composed of polyolefin can be imprinted directly.

According to a preferred embodiment of the invention, the cover film is connected with a carrier film, in particular with a multi-layer carrier film, by way of an additional lamination layer. Accordingly, the lamination layer serves for forming a connection between the previously coated cover film and the carrier film. In particular, the lamination layer is an adhesive layer, for example an adhesive on the basis of polyurethane.

The carrier film is preferably also formed from a polyolefin, wherein this is, in particular, the same polyolefin that is also provided for the cover layer. If the cover layer is therefore formed from a polyethylene, for example, then according to a preferred embodiment of the invention, the carrier film is also formed from a polyethylene, wherein the types of polyethylene can differ from one another, not only between the cover film and the carrier film, but also within the carrier film. Thus, the carrier film can be formed, specifically, not just in one layer but also in multiple layers, wherein the individual layers are usually co-extruded with one another. In particular, the carrier film has at least three layers, wherein the materials of the individual layers can be selected on the basis of the properties to be achieved. Thus, for example, the layer of the carrier film that borders directly on the packaging interior in the finished film packaging can be formed from a material that has a low boiling point or sealing temperature, for example low-density polyethylene, so that accordingly, the packaging can be formed or closed by means of heat-sealing.

The thickness of the carrier film, independent of the concrete embodiment, preferably amounts to between 100 $\mu$m and 170 $\mu$m, particularly preferably between 120 $\mu$m and 160 $\mu$m. According to a further development of the invention, the lamination layer directly follows the barrier layer.

Furthermore, a film packaging in accordance composed of a film composite according to the invention, is an object of the invention, wherein the film composite delimits a packaging interior in such a manner that the cover film forms an outside. Accordingly, according to a preferred embodiment, the carrier film forms an inside, which directly borders on the packaging interior of the film packaging.

Furthermore, a method for the production of a film composite according to the invention is an object of the invention, wherein first a cover film is made available, which can be structured in accordance with the characteristics explained above in connection with the film composite.

This cover film is imprinted, at least in part, on one side, wherein subsequently the cover film is coated with a material that can harden, on the at least partially imprinted side, to form an equalization layer, which material contains at least a proportion of polyurethane.

Preferably the material that can harden is a polyurethane varnish or a two-component polyurethane varnish, which furthermore can contain a proportion of solid particles, for example titanium dioxide particles.

After intermediate storage, during which the material of the equalization layer hardens, after hardening the equalization layer is coated with a material that contains at least a proportion of polyvinyl alcohol, so as to form a barrier layer.

Preferably the material for forming the barrier layer is a liquid solvent, preferably a solvent on the basis of water, which contains a proportion of polyvinyl alcohol in solid form. In this regard, the proportion of the solvent preferably amounts to between 80 and 95 wt.-%, preferably between 84 and 92 wt.-%. The proportion of solids preferably amounts to between 5 and 20 wt.-%, particularly preferably between 8 and 16 wt.-%. Even if the solvent is preferably formed on the basis of water, however, a proportion of ethanol can also be provided, which allows speedier hardening of the barrier layer. For this purpose, the proportion of ethanol preferably amounts to between 20 and 40 wt.-%, particularly preferably between 25 and 35 wt.-%, wherein then, accordingly, the remaining proportion of the solvent is water.

According to a further development of the method according to the invention, the material of the equalization layer that can harden can be smoothed after being applied, so as to form as level a surface as possible, on which the barrier layer then borders. The smoothing can take place, in particular, by means of roller layer pressure.

Preferably, in a final step the cover film, i.e. the imprinted and coated cover film can be connected with a carrier film, with the inclusion of a lamination layer, wherein the lamination layer serves for the connection between the cover film and the carrier film.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings.

DETAILED DESCRIPTION OF PREFERRED EMBODIMENTS

Figure 1:
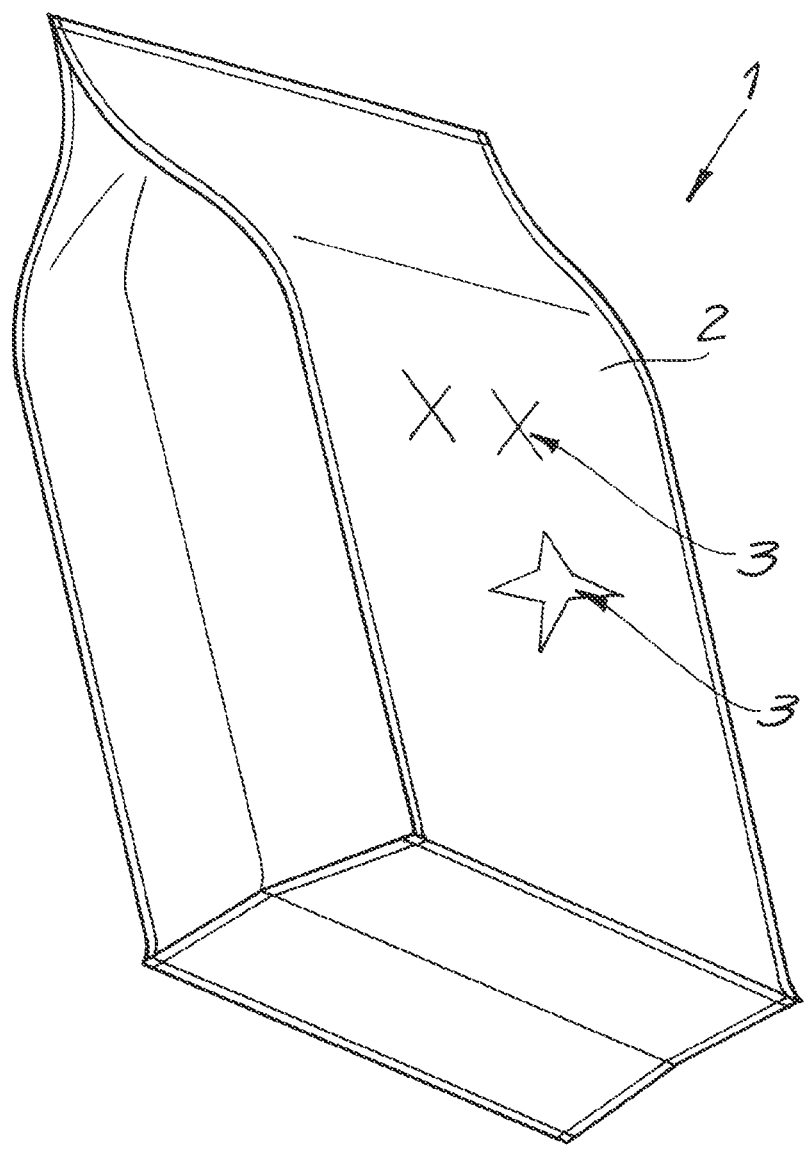
FIG. 1 shows a film packaging in the form of a side-fold bag for animal feed.
Figure 2:
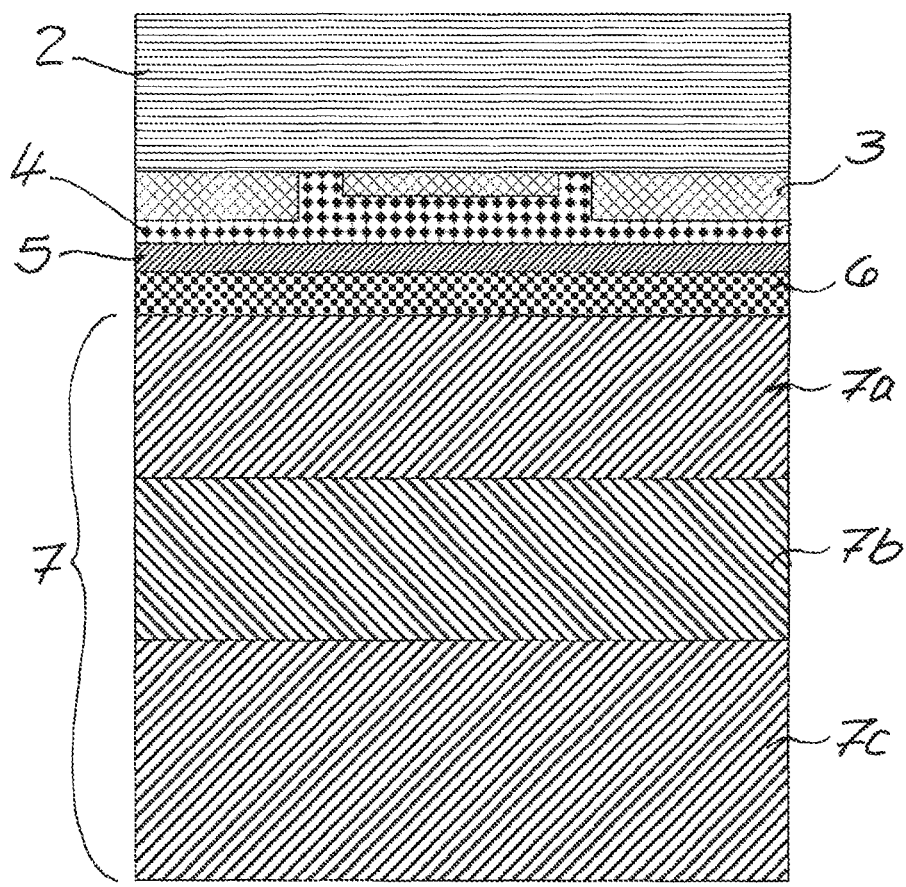
FIG. 2 shows a film composite according to the invention, for forming the film packaging according to FIG. 1.

FIG. 1 shows a flexible film packaging 1 in the form of a side-fold bag having two front walls and two side folds arranged between the front walls. The film packaging 1 is formed from a film composite, wherein a cover film 2 forms the outside of the film packaging 1. Furthermore, an imprinting 3 is visible from the outside, which was applied to a side of the cover film 2 that faces the packaging interior of the film packaging 1, and which is visible due to the transparent configuration of the cover film 2. The film packaging 1 is suitable, in particular, for holding packaged goods in piece form, in particular animal feed, wherein the film composite has barrier properties that effectively prevent, in particular, fat migration from the packaging interior to the outside. This barrier effect is produced by means of the structure of the film composite as shown in FIG. 2.

The structure of the film composite is shown in greater detail in FIG. 2, wherein the materials used as well as the layer thicknesses or weights per surface area of the individual layers can be found in the following table.

| Layer | Layer thickness (weight per surface area) | Composition |
| --- | --- | --- |
| Cover film (2) | 30 μm (28.5 g/m$^2$) | HDPE |
| Imprinting (3) | (2.0 g/m$^2$) | Nitrocellulose varnish |
| Equalization layer (4) | (1.0 g/m$^2$) | Two-component PU varnish + TiO$_2$ particles |
| Barrier layer (5) | (1.0 g/m$^2$) | 66% low-molecular-weight PVOH, 33% high-molecular-weight PVOH, 1% PEI |
| Lamination layer (6) | (2.0 g/m$^2$) | PU adhesive |
| Carrier film (7) | 140 μm (129 g/m$^2$) | 40 μm MDPE/LDPE/LLDPE 40 μm MDPE/LDPE/LLDPE 60 μm LDPE/LLDPE/VLDPE |
| | Total: 164.5 g/m$^2$ | |

The cover film 2 is an oriented polyethylene film composed of a high-density polyethylene (HDPE). As already explained above, the cover film 2 has an imprinting 3, which, however, does not represent a full-area coating of the cover film 2, but rather is arranged only in discrete sections on one side of the cover film 2. The imprinting 3 therefore leads to a certain unevenness of the film 2, which makes it difficult to apply a thin barrier layer 5. The barrier layer 5 is formed on the basis of polyvinyl alcohol (PVOH) and is applied during the course of production, in the form of a liquid solvent. In the hardened state, it has a weight per surface area of only 1 g/m². As a result, this barrier layer 5 is not suitable for equalizing the uneven areas due to the imprinting 3 to such an extent that a continuous barrier layer 5 would be formed. Accordingly, the barrier effect would not exist for the entire film packaging 1.

For this reason, an equalization layer 4 is provided, which evens out the uneven areas caused by the imprinting 3, and makes it possible to apply a continuous barrier layer 5.

The equalization layer 4 is a layer on the basis of polyurethane (PU), which is applied to the coating 3 and to the cover film 2 during the course of production, in the form of a two-component polyurethane varnish. The equalization layer 4 furthermore has solid particles, which contribute to equalizing the uneven areas, on the one hand, and reduce the amount of polyurethane required, and, on the other hand, also develop a certain barrier effect, since then fat can migrate only through the interstices between the individual solid particles. Even though the presence of the solid particles additionally improves the barrier effect, however, the equalization layers 4 can also be formed solely from a layer on the basis of polyurethane that hardens. Both the equalization layer and the barrier layer are present at a weight per surface area of 1 g/m².

The cover film 2 coated in this manner is then connected with a carrier film 7, which borders on the packaging interior of the film packaging 1, by way of a lamination layer 6 composed of a polyurethane adhesive. The carrier film 7 is a three-layer co-extruded film composed of a polyethylene, wherein the individual layers 7a, 7b, 7c differ from one another both with regard to the polyethylene used and with regard to the layer thickness. In this connection, it should be pointed out that the drawing merely represents a schematic structure, and that the individual layer thicknesses and materials can be found in the table shown above. In particular, the layer 7c, which borders directly on the packaging interior, is formed from a layer having a low sealing temperature, so that the film packaging 1 can be closed in a simple manner, by means of a heat-sealing seam.

On the basis of the table shown above, it can also be seen that the weight per surface area of the entire film packaging is 163.5 g/m². In this regard, both the cover film 2 and the carrier film 7 are formed from a polyethylene (PE) and thereby can be recycled together, in a simple manner. In deviation from this, the imprinting 3, the equalization layer 4, the barrier layer 5, and also the lamination layer 6 represent layers that are formed from a different polymer, wherein the proportion of the different polymers, with reference to the total film composite, lies at approximately 3.6%.

Depending on the recycling technology used, the PVOH barrier layer 5 can be removed from the film composite, so that the recyclability is further improved.

In the following table, a comparison example is shown, which uses ethylene vinyl alcohol copolymer (EVOH) as a barrier layer 5 instead of polyvinyl alcohol. Such layers composed of EVOH are usually incorporated in the form of a co-extrusion film, wherein the co-extrusion film is subsequently connected with an imprinted cover film 2 by way of a lamination layer 6. In order to allow co-extrusion of the ethylene vinyl alcohol copolymer layer, adhesion-imparting layers are furthermore provided, by means of which the proportion of other polymers is further increased. In total, this proportion is 11%, according to the example shown, and thereby clearly higher than is the case according to the present invention. In addition, there is the fact that the layer composed of EVOH can be removed from the other layers only with difficulty, due to the co-extrusion. This applies equally also to the adhesion-imparting layers, so that a clear advantage with regard to recyclability results from the use of polyvinyl alcohol according to the present invention.

| Layer | Layer thickness (weight per surface area) | Composition |
| --- | --- | --- |
| Cover film (2) | 30 μm (28.5 g/m²) | HDPE |
| Imprinting (3) | (2.0 g/m²) | Nitrocellulose varnish |
| White background | (1.0 g/m²) | Two-component PU varnish + TiO₂ particles |
| Lamination layer (6) | (2.0 g/m²) | PU adhesive |
| Carrier film (7) | 140 μm (130.5 g/m²) | 60 μm LDPE/LLDPE/MDPE 5 μm adhesion-imparting agent 5 μm EVOH 5 μm adhesion-imparting agent 65 μm LDPE/LLDPE/VLDPE |
| | Total: 164.0 g/m² | |

Although only a few embodiments of the present invention have been shown and described, it is to be understood that many changes and modifications may be made thereunto without departing from the spirit and scope of the invention.

What is claimed is:

1. A film composite for film packaging, comprising a cover film composed of a polyolefin, a barrier layer, and an equalization layer arranged between the cover film and the barrier layer, the equalization film directly bordering the barrier layer, a lamination layer in the form of an adhesive layer based on polyurethane, the lamination layer directly bordering the barrier layer on a side opposite the equalization layer, and a carrier film directly bordering the lamination layer, wherein the cover film has an imprinting, at least in part, on a side that faces the barrier layer, wherein the equalization layer borders, at least in part, on the imprinting, and wherein the equalization layer is formed from a hardened material on the basis of polyurethane, wherein the barrier layer is formed on the basis of polyvinyl alcohol (PVOH) and wherein the barrier layer has a weight per surface area between 0.5 g/m² and 2.5 g/m².

2. The film composite according to claim 1, wherein the hardened material is a polyurethane varnish.

3. The film composite according to claim 1, wherein the proportion of polyolefin, with reference to the total film composite, amounts to more than 90 wt.-%.

4. The film composite according to claim 1, wherein solid particles are arranged in the equalization layer.

5. The film composite according to claim 4, wherein the proportion of the solid particles in the equalization layer amounts to between 5 and 50 vol.-%.

6. The film composite according to claim 4, wherein the solid particles have an average diameter between 150 and 800 nm.

7. The film composite according to claim 4, wherein the solid particles are titanium dioxide particles, at least in part.

8. The film composite according to claim 1, wherein the imprinting does not extend over the full area of the cover film, and wherein the equalization layer encloses the imprinting in such a manner that the equalization layer forms an essentially level surface on the side bordering on the barrier layer.

9. The film composite according to claim 1, wherein the equalization layer has a weight per surface area between 0.5 g/m² and 2.5 g/m².

10. The film composite according to claim 1, wherein the barrier layer has a proportion of polyethylenimine (PEI).

11. The film composite according to claim 10, wherein the proportion of polyethylenimine in the barrier layer amounts to between 0.5 and 1.5 wt.-%.

12. The film composite according to claim 1, wherein the polyolefin of the cover film is a polyethylene.

13. The film composite according to claim 1, wherein the carrier film is formed from a polyolefin.

14. A film packaging composed of a film composite according to claim 1, wherein the film composite delimits a packaging interior in such a manner that the cover film forms an outside.

15. A method for the production of a film composite according to claim 1, comprising the steps of:
   providing the cover film;
   imprinting the cover film at least in part;
   coating the cover film with a hardenable material, so as to form the equalization layer on the at least partially imprinted side, which material has at least a proportion of polyurethane; and
   after hardening, coating the equalization layer with a material for forming the barrier layer.

16. The method according to claim 15, wherein the material for forming the barrier layer is formed from a liquid solvent and a proportion of polyvinyl alcohol in solid form.

17. The method according to claim 15, wherein the hardenable material of the equalization layer is smoothed after being applied.

18. The method according to claim 15, wherein the cover film is connected with a carrier film, with the inclusion of a lamination layer.

* * * * *